April 22, 1924.

C. H. THORNBLADE

STOVE

Filed July 6, 1922

1,491,570

Inventor
Carl Hugo Thornblade
By H.L. & A.L. Reynolds
Attorneys

Patented Apr. 22, 1924.

1,491,570

UNITED STATES PATENT OFFICE.

CARL HUGO THORNBLADE, OF LOS ANGELES, CALIFORNIA.

STOVE.

Application filed July 6, 1922. Serial No. 573,109.

*To all whom it may concern:*

Be it known that I, CARL HUGO THORN-BLADE, a citizen of the United States, and resident of Los Angeles, in the county of Los Angeles and State of California, have invented certain new and useful Improvements in Stoves, of which the following is a specification.

My invention relates to a stove which is designed particularly for heating but which may be employed for cooking as well. It is particularly intended for use in connection with an oil burner, though I do not desire to be limited only to the use of oil as fuel except as may be inferred from the claims terminating this specification.

An object of my invention is to provide means whereby a heater of the type employing a reflector may readily be converted into a cooking stove.

A further object is the provision of means whereby such a heater may be employed for baking.

A further object is the provision of an attachment for such stoves which will serve as an oven.

A further object is the provision of a convenient and compact stove embodying the improvements enumerated above and capable of being easily transported from place to place.

A further object is the provision of improved means for controlling the supply of gas generated in the oil burner.

A further object is the provision of means for removing and eliminating carbon from the valve stem of the control valve in the gas generator.

My invention comprises those novel parts and combinations thereof which are shown in the accompanying drawings, described in the specification, and particularly defined by the claims terminating the same.

In the accompanying drawings I have shown my invention in the form of construction which is now preferred by me.

Figure 1:
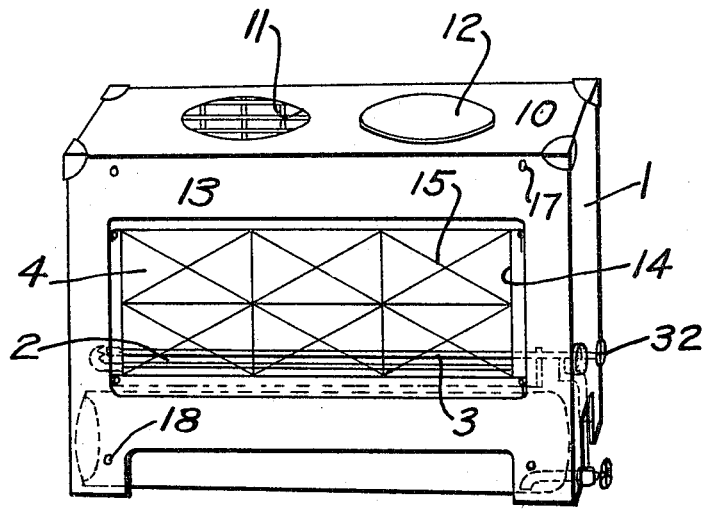
Figure 1 is a perspective view of my heater.

In general my invention comprises a casing 1 having its upper surface 10 arranged for the support of pans for cooking. I have shown two apertures 11 adapted to be covered by covers 12, which may be removed as in an ordinary range to apply greater heat to the pans. The front face 13 of the casing 1 is provided with a large opening 14 which may be covered by a removable grating 15 if desired. The opening 14 is to permit reflection of heat outwardly when the device is used as a heater.

Within the casing 1 is a burner, preferably an oil burner, which is indicated in general by the numeral 2. An oil tank 20 may be positioned beneath the burner 2 to supply fuel if desired. The burner 2 consists of a generator tube 3 positioned above a gas channel 21 which has a number of upwardly extending apertures 22 forming the burner holes. Preferably the burner, with the exception of the generator tube 3 and associated parts, is formed as a casting which may be secured to the casing 1 by means of a suitable bracket 26.

Figure 2:
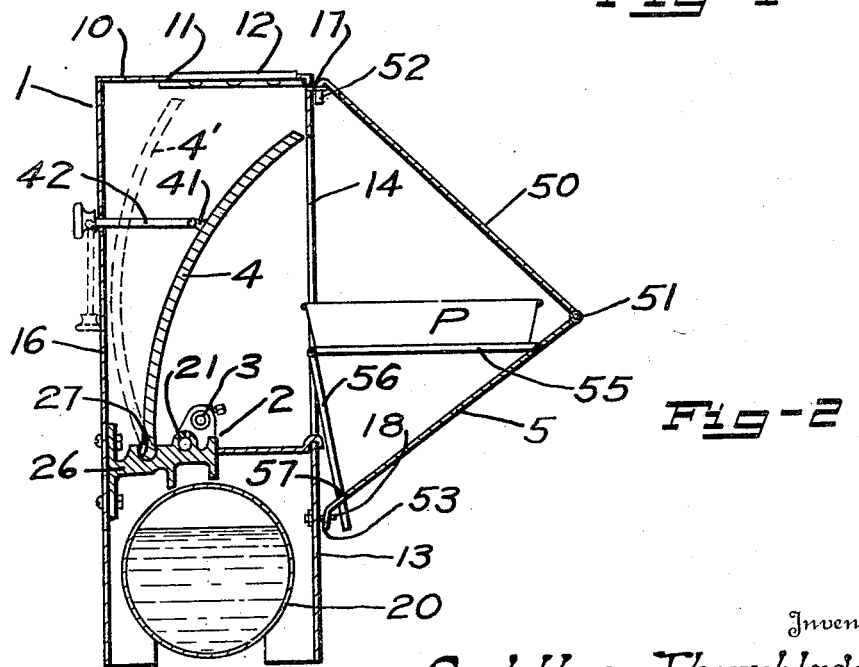
Figure 2 is a vertical transverse section therethrough showing the oven attachment in place.

The casting which forms the burner is provided, preferably, with a channel 27 extending substantially parallel to the burner channel 21. A reflector 4, which may have its reflecting surface covered by asbestos or other suitable refractory material, is positioned above the burner 2 and may have its lower edge received pivotally in the channel 27. In this way the reflector may be swung from its normal position above the burner 2 where it reflects heat therefrom outward through the opening 14, to a position indicated by the dotted lines 4' in Figure 2. In this position the heat, instead of being reflected outward, is permitted to reach the upper cooking surface 10. Such pivoting of the reflector 4 is advantageous for the further reason that if in starting the burner the generator is not properly heated, smoke is generated, and by swinging the reflector back its asbestos surface is moved backward out of the range of this smoke until the blue gas flame is lighted. Thus the reflector is not smoked up. Means are provided for holding the reflector 4 in this position. I have shown a boss 41 as projecting rearwardly therefrom and a handle 42 pivotally secured thereto and extending through an aperture in the rear wall 16 of the casing. The handle may be swung down after the boss 41 has been projected through its aperture, and in this manner the reflector is held in raised position.

At times it is desirable to employ the device for baking, and to this end I have provided an oven attachment consisting of an upper plate 50 and a lower plate 5 which are secured together, preferably pivotally, along their adjacent edges, as shown at 51, and which are provided with means for attachment to the front surface 13 of the casing. I have shown the plate 50 as having hooks 52 and the plate 5 as having hooks 53 which are receivable respectively in eyes 17 and 18 in the casing.

I have shown both the plates 5 and 50 as inclined. the bottom plate being inclined to permit free access of heat beneath the pan P, and the plate 50 to permit reflection of heat downward upon the pan. It is therefore necessary to provide a shelf, as 55, within the oven attachment. One edge of this shelf may rest upon the bottom plate 5 and it has secured to its other edge one or more legs 56. These legs are provided with shoulders 57 near their lower ends and the lower ends of the legs below the shoulders 57 pass through suitable apertures in the bottom plate 5. Above the shoulders 57 the legs lean against the front 13 of the casing or against the grate 15 if this remains in place.

What I claim as my invention is:

1. In a stove, a casing having an open front and a top providing a cooking surface, a burner within the lower part of the casing, a reflector extending across the casing from the rear of the burner upward and forward to the upper edge of the front opening to normally mask the cooking surface, the upper edge of the reflector being movable backwardly to expose the casing top to the burner.

2. In a stove, a casing having an open front and a top providing a cooking surface, a burner within the lower part of the casing, a reflector extending across the casing from the rear of the burner upward and forward to the upper edge of the front opening to normally mask the cooking surface, the upper edge of the reflector being movable backwardly to expose the casing top to the burner, a controlling rod hingedly connected with the reflector from the rear and extending through the rear wall of the casing.

3. In a stove, a casing having an upper cooking surface and an open front face, a burner within said casing, a reflector pivoted by an edge adjacent the burner, and normally extending thereover to reflect heat therefrom outward through the open face, a boss extending rearwardly from the reflector, and a handle pivoted upon said boss, and extending through an aperture in the rear face of the casing, whereby the reflector may be moved rearwardly to permit access of heat from the burner to the upper cooking surface, and whereby the reflector is so held by pivoting the handle at an angle to the boss.

4. In a stove, a casing having an upper cooking surface and an open front face, a casting supported within the casing and having a channel therein with a series of apertures forming a gas burner, a gas generator tube extending above said apertures and communicating with the burner channel, an upwardly opening channel in said casting paralleling the burner channel, a reflector having its lower edge pivotally received in said upwardly opening channel, and normally extending above the burner to reflect heat therefrom outward through the open front of the casing, and means for swinging said reflector rearwardly to permit access of heat from the burner to the upper cooking surface, and for holding the reflector in such position.

5. In a stove, a casing having an open front face, a burner within the casing, a reflector above said burner to reflect heat therefrom outward through the open front, an oven casing adapted to be secured to said first casing outside of the open front, the bottom of the oven casing being inclined, a pan support comprising a shelf adapted to rest along one edge upon the bottom of the oven casing, shouldered inclined legs supporting the opposite edge of said shelf, the lower ends of said legs being received in apertures in the bottom of the oven casing, the shoulders resting upon said bottom, and the legs above said shoulders resting against the front face of the stove casing.

Signed at Seattle, Washington, this 29th day of June, 1922.

CARL HUGO THORNBLADE.